United States Patent [19]
Schulz-Andres

[11] Patent Number: 5,732,810
[45] Date of Patent: Mar. 31, 1998

[54] FRICTION CLUTCH WITH A PULSE GENERATOR

[75] Inventor: Heiko Schulz-Andres, Reinfeld, Germany

[73] Assignee: Fichtel & Sachs AG, Schweinfurt, Germany

[21] Appl. No.: 708,634

[22] Filed: Sep. 5, 1996

[30] Foreign Application Priority Data

Sep. 13, 1995 [DE] Germany .................. 195 33 671.2

[51] Int. Cl.$^6$ .................. F16D 13/58; F16D 13/50
[52] U.S. Cl. .................. 192/70.27; 192/30 W; 192/89.23; 74/572
[58] Field of Search .................. 192/30 W, 70.11, 192/70.27, 89.22, 89.23, 89.24; 74/572; 123/414

[56] References Cited

U.S. PATENT DOCUMENTS

| | | | |
|---|---|---|---|
| 4,493,409 | 1/1985 | Steeg | 192/30 W X |
| 4,570,772 | 2/1986 | Alas et al. | 192/70.11 X |
| 4,635,776 | 1/1987 | Billet et al. | 192/70.27 |
| 4,650,050 | 3/1987 | Alas et al. | 192/89.24 X |
| 4,650,051 | 3/1987 | Billet et al. | 192/89.24 X |
| 5,388,474 | 2/1995 | Tanaka et al. | |

FOREIGN PATENT DOCUMENTS

| | | |
|---|---|---|
| 3416316 | 5/1987 | Germany . |
| 2144810 | 3/1985 | United Kingdom . |

*Primary Examiner*—Richard M. Lorence
*Attorney, Agent, or Firm*—Cohen, Pontani, Lieberman, Pavane

[57] ABSTRACT

A friction clutch has an inertia mass attachable to a drive, a housing that serves to accommodate a pressure spring as well as a pressure plate, and a ring that encompasses the rotational axis of the inertia mass and housing and acts, in connection with a signal receiver, as a pulse generator. This ring, because it is not very thick in the radial direction, can be deformed by even small radial forces, so that its inner diameter can be adapted by enlargement or shrinking to the outer diameter of a component intended for its accommodation, such as an inertia mass or housing, in order to establish a friction locking connection between the ring and the outer diameter of the component.

10 Claims, 5 Drawing Sheets

5,732,810

1

FRICTION CLUTCH WITH A PULSE GENERATOR

BACKGROUND OF THE INVENTION

1. Field of the Invention

The invention relates to a friction clutch for motor vehicles.

2. Description of the Prior Art

From DE 34 16 316 A1, it is known to rivet a ring having markings to the housing of a motor vehicle friction clutch, for the purpose of acting as a pulse generator for a signal receiver that monitors the rotational movement of the housing. As shown in the drawing that accompanies this reference, the ring is slipped over a conical area of the housing where, finding no support on the housing, it must be equipped with reinforcements. It is disadvantageous that the ring is relatively difficult and expensive to attach to the housing due to the reinforcements, and relatively complicated to attach due to the riveting.

SUMMARY OF THE INVENTION

Accordingly, it is an object of the present invention to provide a ring which acts as a pulse generator for a signal receiver and is attached to a friction clutch for a motor vehicle. It is a further object to provide a ring that can be attached with the least labor possible and requires minimum expenditure in respect to cost and weight.

Pursuant to this object, and others which will become apparent hereafter, one aspect of the present invention resides in a friction clutch having a housing, a pressure plate arranged in the housing, a pressure spring arranged in the housing adjacent the pressure plate, and an inertia mass adjacent to the housing and configured to be attachable to a drive. The housing and the inertia mass are rotatable about an axis. The friction clutch further includes pulse generator means made up of a ring arranged to encompass the rotational axis of the inertia mass and the housing, and a signal receiver operatively arranged at the ring. The ring has a small thickness in the radial direction so that it can be easily deformed so that an inner diameter of the ring is frictionally connected to an outer diameter of one of the inertia mass and the housing. Because the ring is not very thick in the radial direction, even relatively small forces acting in this direction suffice to set the ring on the outer diameter of a disk-shaped or ring-shaped component of the friction clutch. According to the present invention, this can be done either by widening the ring to the size of the outer diameter of the component, or by narrowing the ring to this size through shrinking. The aforementioned component can be, for example, the inertia mass of a conventional clutch, the primary inertia mass of a two-mass flywheel, or a section of the clutch housing which accommodates the diaphragm spring and the pressure plate. The substantially axial course of the outer diameter of the component that accommodates the ring in the area of extension of the ring is advantageous here.

In another embodiment of the invention, the ring can be manufactured very simply, and thus economically, when the source material for its production is a strip material of low bending resistance, which is bent into a ring and then has its two ends welded together.

In order to act as a pulse generator, the ring according to the invention is provided with a plurality of markings around its circumference. These markings can either be designed as recesses, which can be produced by punching or boring, or else the ring can be given the approximate shape of a toothed rim, in that material is displaced at predetermined distances, seen in the circumferential direction. This can be accomplished by means of an appropriate rolling process, leading to the formation of a radial warp between every two radial indentations.

In still another embodiment of the invention, the ring is attached to an axial shoulder that forms a single piece with the housing. Of course, this shoulder itself can be designed as the ring according to the invention, by providing the shoulder with markings, for example, by means of punching.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
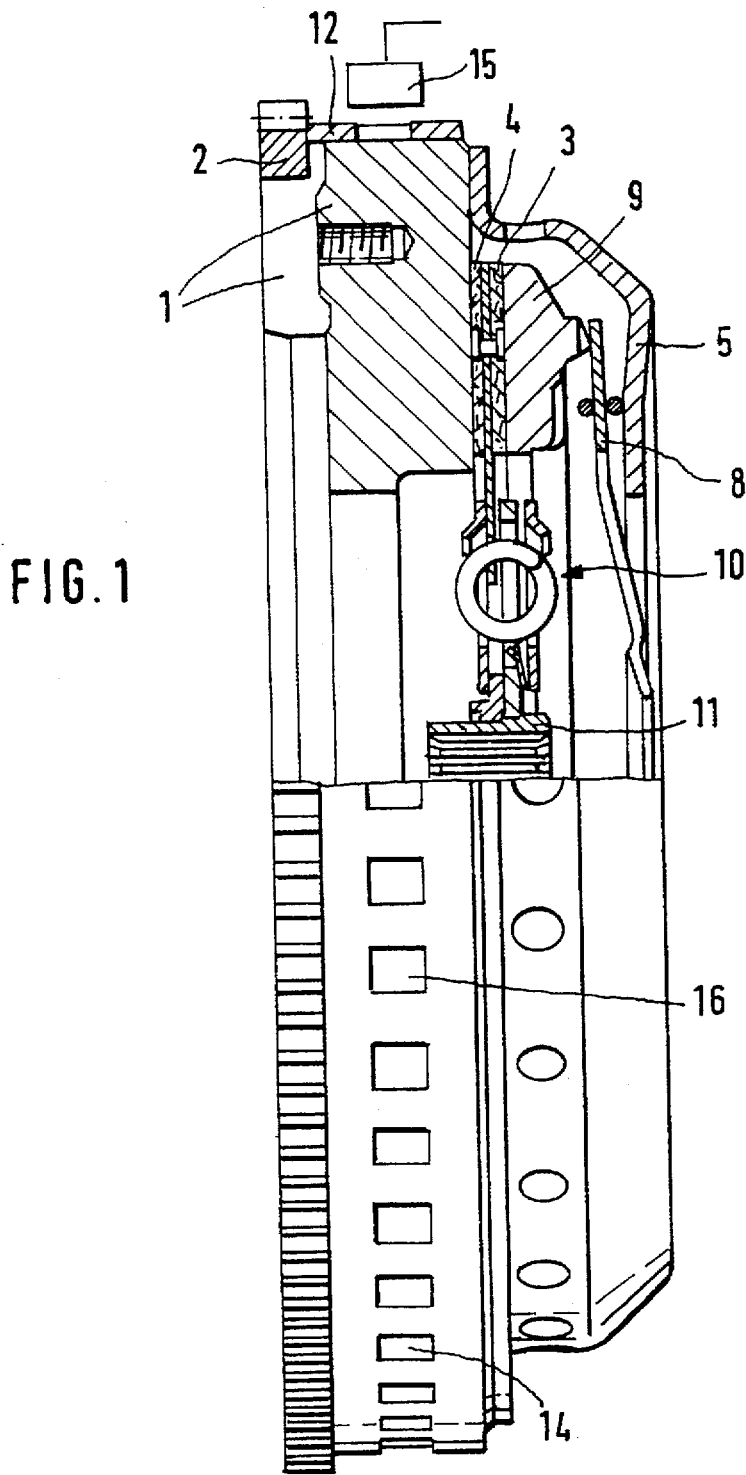
FIG. 1 A partially sectional side view of a friction clutch with a ring, which is located on an inertia mass and acts as a pulse generator, pursuant to the present invention.

FIG. 1 shows a friction clutch for a motor vehicle. On the left in FIG. 1., there is an inertia mass 1 which can be attached to a crankshaft (not shown) of an internal combustion engine. In its radially outer area, the inertia mass 1 carries a toothed rim 2, which can be placed into active connection with a starting pinion (not shown) and which accommodates a housing 5 that carries (in a manner known and therefore not shown) a pressure spring 8, for example, a diaphragm spring, which can act via a pressure plate 9 on a friction lining 3 of a clutch disk 10. The clutch disk 10 has a further friction lining 4 on its other side and rests with this lining 4 on a counterpressure plate, which can be formed, for example, by the inertia mass 1. In its radially inner area, the clutch disk 10 carries a hub 11, via which the clutch disk 10 can be connected in a non-rotatable manner to a gear shaft (not shown).

Figure 6:
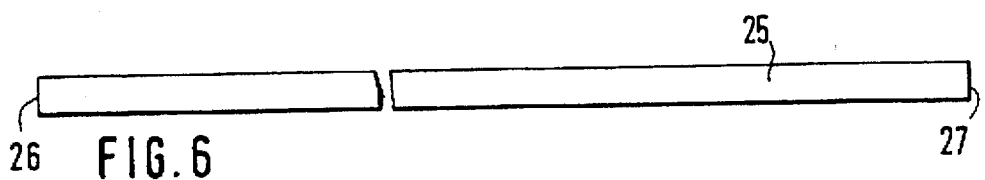
FIGS. 6–8 illustrate steps for producing the ring.
Figure 7:
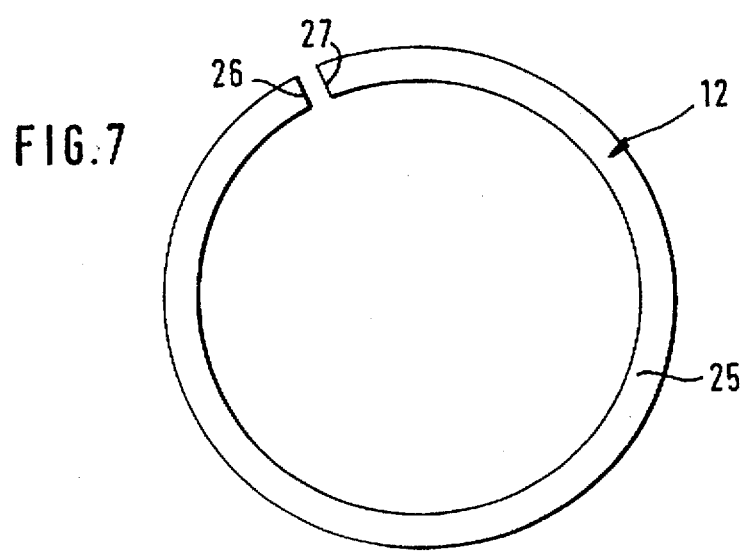
Figure 8:
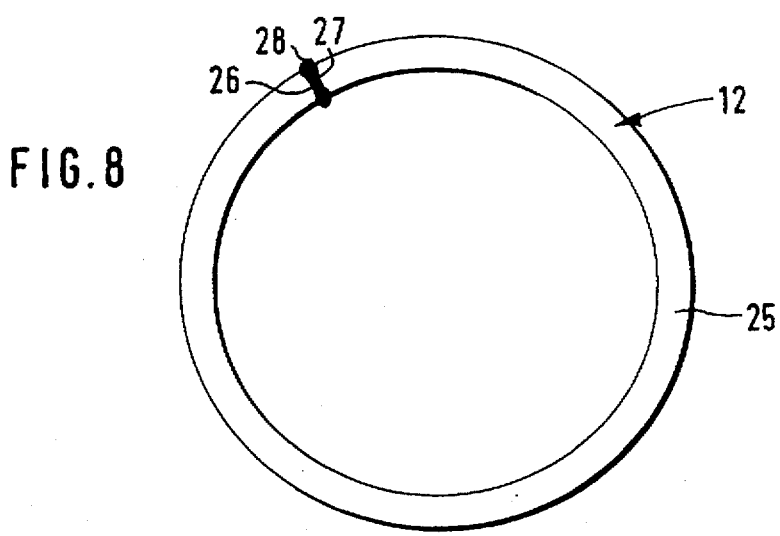

As illustrated by the upper half of the friction clutch shown in FIG. 1, a ring 12 is provided in the radial outer area of the inertia mass 1 bordering the toothed rim 2. The ring 12, which is radially enlarged prior to being placed on the inertia mass 1, sits on the inertia mass 1 in a force-locking manner; i.e., having undergone elastic narrowing after being placed on the inertia mass 1. Alternatively, a ring 12 having little play in its inner diameter relative to the outer diameter of the inertia mass 1 can be slipped onto the inertia mass 1 and shrunk to the mass. What is essential here is that the inner diameter of the ring 12 can be adapted to the outer diameter of the inertia mass 1 by means of a slight diameter change of the ring 12 in the radial direction, so that a force-locking connection is established between the inertia mass 1 and the ring 12. Preferably, a metal sheet of low bending resistance, such as a strip material 25 (FIG. 6), is suitable as the source material for a ring of this type. The strip material is used to produce the ring 12 by being bent into a ring shape (FIG. 7) and having its two strip ends 26, 27 connected to one another by a welded seam 28.

Figure 4:
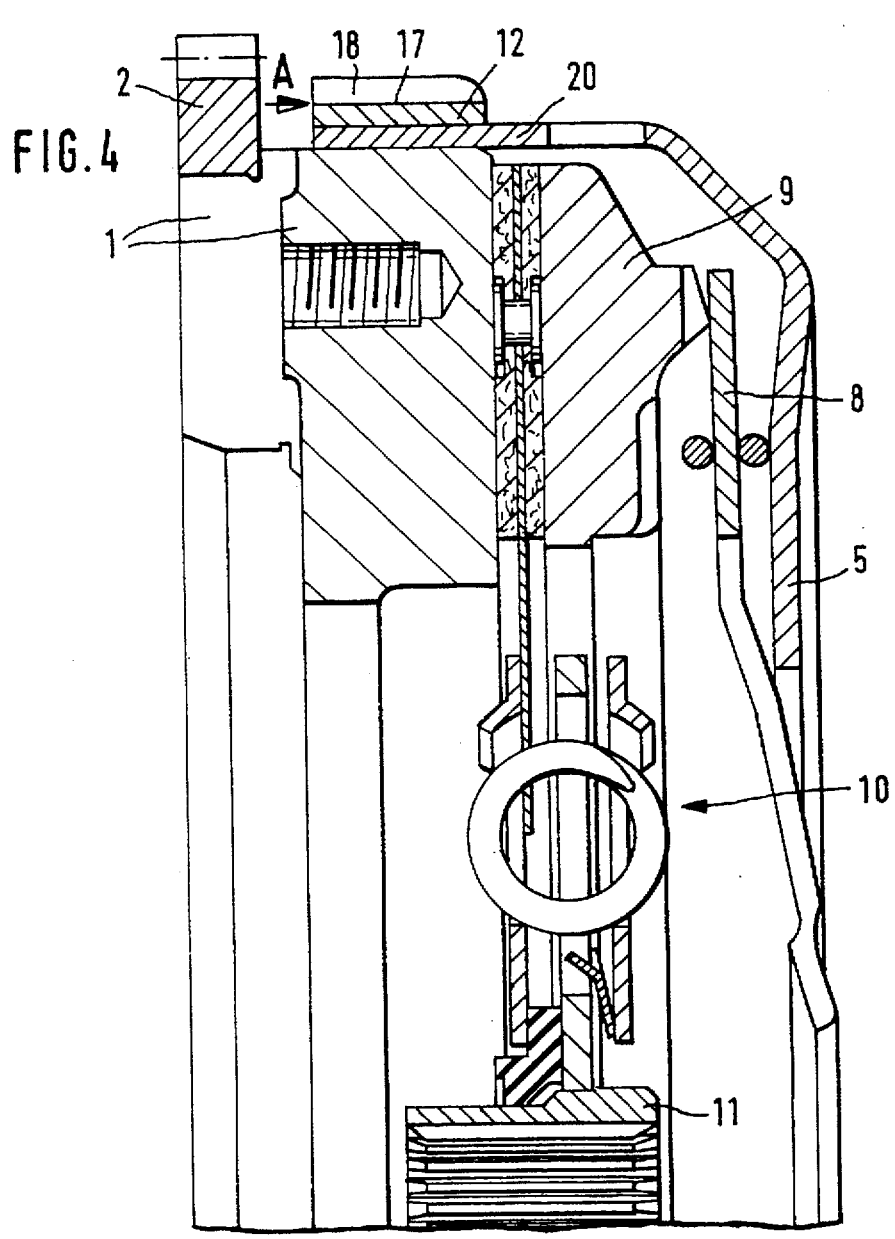
FIG. 4 is a view similar to FIG. 2, with radial indentations and warps in the circumferential area of the ring.
Figure 5:
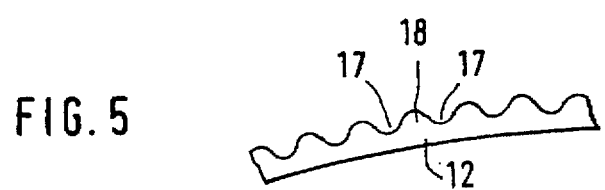
FIG. 5 is a segment of the ring in FIG. 4.

The ring 12 is provided with a plurality of markings 14 located equidistant to one another in the circumferential direction. In connection with a signal receiver 15 (shown schematically), these markings 14 act as a pulse generator, in that whenever one of the markings 14 is located in the extension area of the signal receiver 15, the receiver 15 sends a signal to an electronic analysis system connected downstream. An electronic analysis system of this type, as known, for example, from the prior art described in DE 34 16 316 A1, can be used to determine the instantaneous speed of the internal combustion engine, or the ignition timing, or other parameters, so that it is possible to carry out required corrections or adjustments of the ignition timing or the fuel supply, as needed, dependent on the operational states of the internal combustion engine. The markings 14 are preferably formed by recesses 16 which can be produced by stamping or boring the ring 12. It is also conceivable, however, for the ring to be subjected to processing in its radially outer area so that material displacements are carried out at predeterminable distances, seen in the circumferential direction, leading to a warp 18 of the material between each two radial indentations 17 (FIGS. 4 and 5), respectively. Due to this material displacement, the ring has an outer contour similar to a toothed rim, and each of the radial warps 18, for example, can act as a marking 14.

Figure 2:
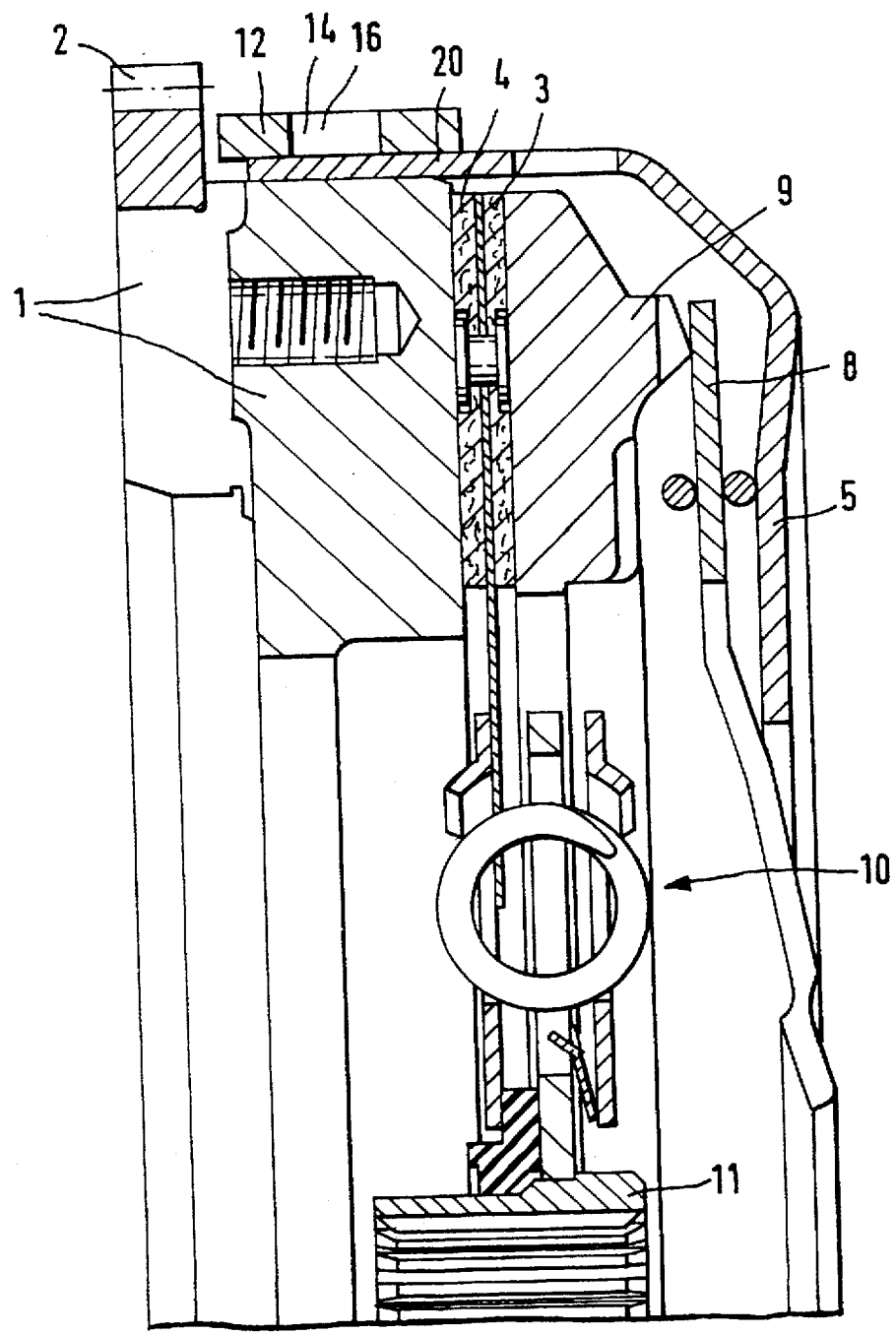
FIG. 2 is a view similar to FIG. 1, but with a ring located on an axial shoulder of a housing.

FIG. 2 shows an embodiment of the housing 5, in which the housing 5 has an axial shoulder 20 in the circumferential area running in the direction of the inertia mass 1. The shoulder 20 serves to accommodate the ring 12, which can be produced and attached in the same manner as already described in detail in above. As an alternative, it is possible for the axial shoulder 20 itself to perform the function of the ring 12, in that it is provided with markings 14 (FIG. 3).

Figure 3:
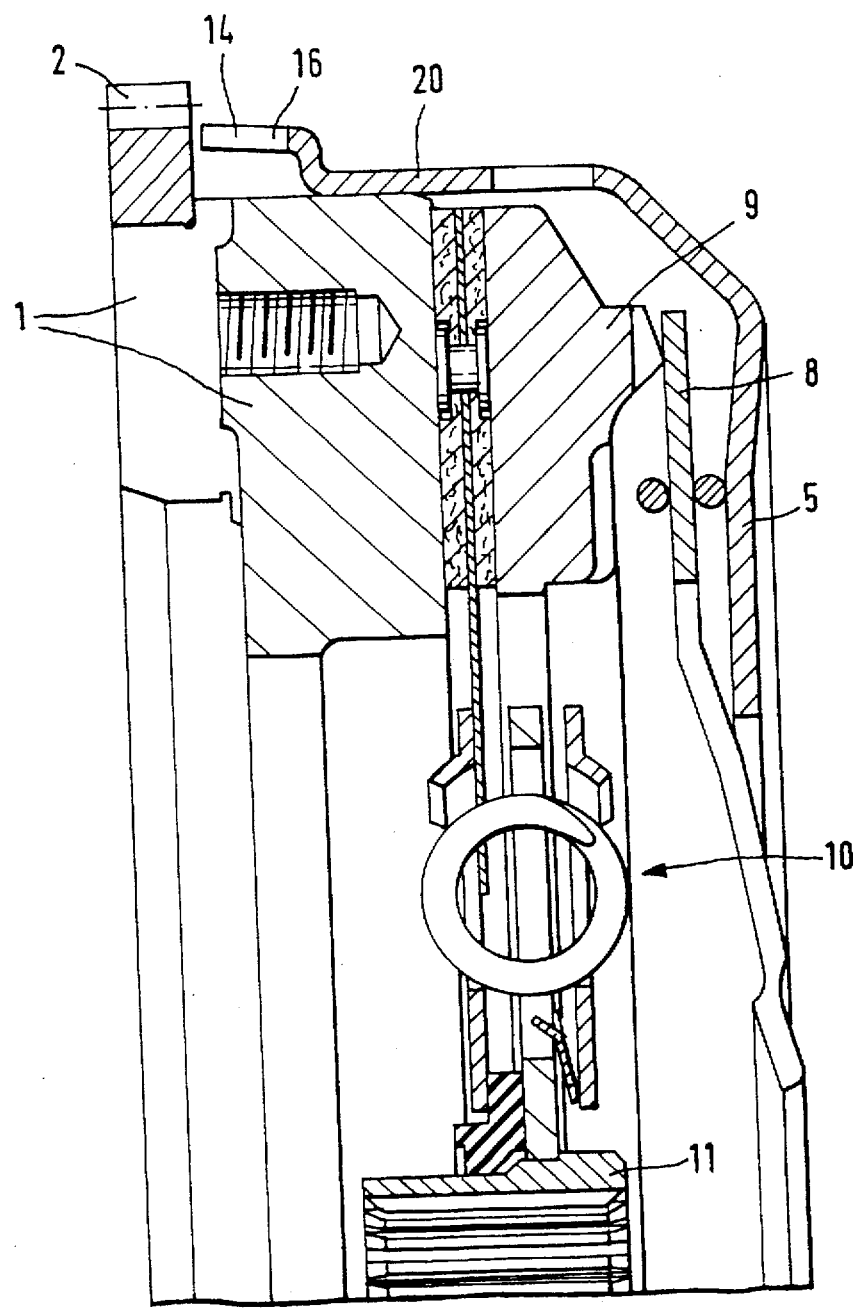
FIG. 3 is a view similar to FIG. 2, with an embodiment of the axial shoulder of the housing as a pulse-generating ring.

The embodiment according to FIGS. 2 and 3 is intended to preferably be used with friction clutches in which the housing, with its axial shoulder 20, radially encircles the inertia mass 1.

Of course, in respect to all embodiments, it must be always be ensured that the ring 12—or, in the embodiment of the axial shoulder 20 with markings 14, the shoulder 20—is connected so as to be exactly positioned in the rotational direction relative to the particular inertia mass 1.

Only then is it ensured that the signals sent via the signal receiver 15 to an electronic analysis system reflect the actual operating state of the friction clutch.

The invention is not limited by the embodiments described above which are presented as examples only but can be modified in various ways within the scope of protection defined by the appended patent claims.

I claim:

1. A friction clutch, comprising: a housing; a pressure plate arranged in the housing; a pressure spring arranged in the housing; an inertia mass adjacent the housing and configured to be attachable to a drive, the housing and the inertia mass being rotatable about an axis; and, pulse generator means including a ring arranged to encompass the rotational axis of the inertia mass and the housing, and a signal receiver operatively arranged at the ring, the ring having a low thickness in the radial direction so as to be easily deformable so that an inner diameter of the ring is frictionally connected to an outer diameter of one of the inertia mass and the housing.

2. A friction clutch as defined in claim 1, wherein the ring is formed of a material of low bending resistance.

3. A friction clutch as defined in claim 2, wherein the ring is formed of a strip material bent into ring shape having ends that are welded together.

4. A friction clutch as defined in claim 1, wherein the ring has an outer circumference provided with markings at predeterminable distances around the circumference, each of the markings being operative to trigger the signal receiver to output a pulse.

5. A friction clutch as defined in claim 4, wherein the markings are formed as recesses in the outer circumference of the ring.

6. A friction clutch as defined in claim 4, wherein the markings are material displacements in the outer circumference of the ring.

7. A friction clutch as defined in claim 6, wherein the material displacements are radial indentations.

8. A friction clutch as defined in claim 6, wherein the material displacements are radial warps.

9. A friction clutch as defined in claim 1, wherein the housing has an axial shoulder on its outer circumference, the shoulder being arranged so as to run in a direction of and radially encompass the inertia mass, the shoulder being provided with markings arranged to trigger the signal receiver.

10. A friction clutch as defined in claim 1, wherein the housing has an axial shoulder on its outer circumference, the shoulder being arranged so as to run in a direction of and radially encompass the inertia mass, the ring being mounted on the axial shoulder and having markings arranged to trigger the signal receiver.

* * * * *